United States Patent

[11] 3,563,290

[72] Inventor Melvin E Bricker
 2723 Saddleback Drive, Cincinnati, Ohio 45244
[21] Appl. No. 39,002
[22] Filed May 20, 1970
[45] Patented Feb. 16, 1971

[54] POWER UNIT FOR VEGETABLE CUTTER
 5 Claims, 2 Drawing Figs.
[52] U.S. Cl. ............................................ 146/115, 74/16
[51] Int. Cl. ............................................ B26d 1/28, B26d 4/22
[50] Field of Search ............................................ 146/115, 114; 74/16

[56] References Cited
UNITED STATES PATENTS
| | | | |
|---|---|---|---|
| 2,585,673 | 2/1952 | Ottersland | 146/114X |
| 3,191,523 | 6/1965 | Fritz | 146/114X |
| 3,416,583 | 12/1968 | Bricker | 146/115 |

Primary Examiner—Willie G Abercrombie
Attorney—Wood, Herron & Evans

ABSTRACT: A unitary power unit for vegetable cutters including a housing, a motor, a speed-reducing drive, and a hub for supporting a vegetable cutter attachment and connecting it to the speed-reducing drive. The hub is mounted on the front wall of the housing. Legs are mounted on the front portion power unit to raise it above its rear portion, thereby tilting it and any implement attached thereto. The legs extend forwardly of the front wall to provide stability during operation.

PATENTED FEB 16 1971  3,563,290

INVENTOR.
Melvin E. Bricker
BY
Wood, Herron and Evans
ATTORNEYS

3,563,290

POWER UNIT FOR VEGETABLE CUTTER

BACKGROUND OF THE INVENTION

The present invention relates generally to power units for food cutters and is particularly directed to a high-speed drive for vegetable cutters, such as cabbage shredders, utilized in restaurants, carryout food stores and other establishments which prepare food in large quantities. Up to the present time these vegetable cutters have been mounted on, and driven by, heavy power units built originally for other purposes, such as mixers and other devices which have proved very inefficient due to their low speed and awkwardness.

Since the normal drive speed of a mixer, or the like, is relatively slow, it has been proposed to raise their output speed by adding an auxiliary speedup attachment between the mixer and vegetable cutter. One form of such attachment is shown in my earlier U.S. Pat. No. 3,416,583. In some cases this arrangement has proven cumbersome and less than completely satisfactory. In the first place, it takes up an objectionable amount of counter or table space. Moreover, it requires an appreciable amount of time to set up since three different units must be connected to get the whole device into operation. Also, while the mixer unit is being employed to drive the vegetable cutter, it cannot be efficiently used for mixing or the other functions for which it is primarily intended while simultaneously cutting.

The present invention contemplates a small, integral power unit complete with a motor, speed-reducing drive and a hub for supporting a vegetable cutter attachment and establishing a driving connection to the rotary cutter disc thereof. In accordance with the present invention, the power unit is supported at an angle to the horizontal, i.e., the axis of the unit is tilted upwardly so that the vegetable cutter is likewise supported in a tilted position. More particularly, in the power unit the motor, which is the heaviest element of the unit, is mounted at the rear, lowermost portion of the unit while the lighter weight speed-reducing drive is mounted adjacent to the front or elevated wall of the unit which also carries the mounting hub. The housing is supported at its forward end by legs which extend downwardly and forwardly of the front wall. The legs are of a sufficient length so that the drive axis of the hub is preferably elevated at an appreciable angle, for example, of from 15°—20°.

One of the principal advantages of the present power unit is that it provides a compact, highly efficient drive for supporting and rotating vegetable cutters at their optimum speed. The power unit occupies only a minimum amount of shelf space and its use frees other heavy duty equipment, such as mixers, for the types of jobs for which they were originally designed.

Another advantage of the present invention resulting from the tilted construction of the present power unit is that a more efficient gravity feed is obtained from the vegetable cutter. This reduces the cutting time and reduces the pressure which need be applied by the operator. Moreover, the vegetable cutter unit is elevated above the countertop to provide a convenient space for the insertion of a pan or other product-receiving container below the discharge chute of the cutter.

A still further advantage of the present power unit is that it is extremely stable. More particularly, because of the tilted configuration, with the heavy motor element being disposed at the lowermost rearward portion of the unit, and with the forward support legs of the unit extending forwardly from the front wall, the unit at all times remains firmly seated on the counter. Even when the vegetable slicer attachment is fully loaded and actuated, there is no tendency of the unit to tip over.

Moreover, the present power unit renders the operation of the vegetable cutter safer than is the case with a horizontally oriented attachment of the type shown in U.S. Pat. No. 3,416,583. Specifically, by supporting the vegetable cutter attachment in an upwardly tilted position, it becomes more difficult for an operator to reach over the top wall of the unit and then reach his hand downwardly into the area of the cutter.

It is another object of the present invention to provide a power unit in which the cutter-supporting boss can readily be replaced with a boss of a different configuration and size so that the power unit can be adapted to drive different types and makes of vegetable cutters as well as other types of attachments.

These and other objectives and advantages of the invention of this application will be better understood from a description of the drawings illustrating a preferred embodiment of the invention.

Figure 1:
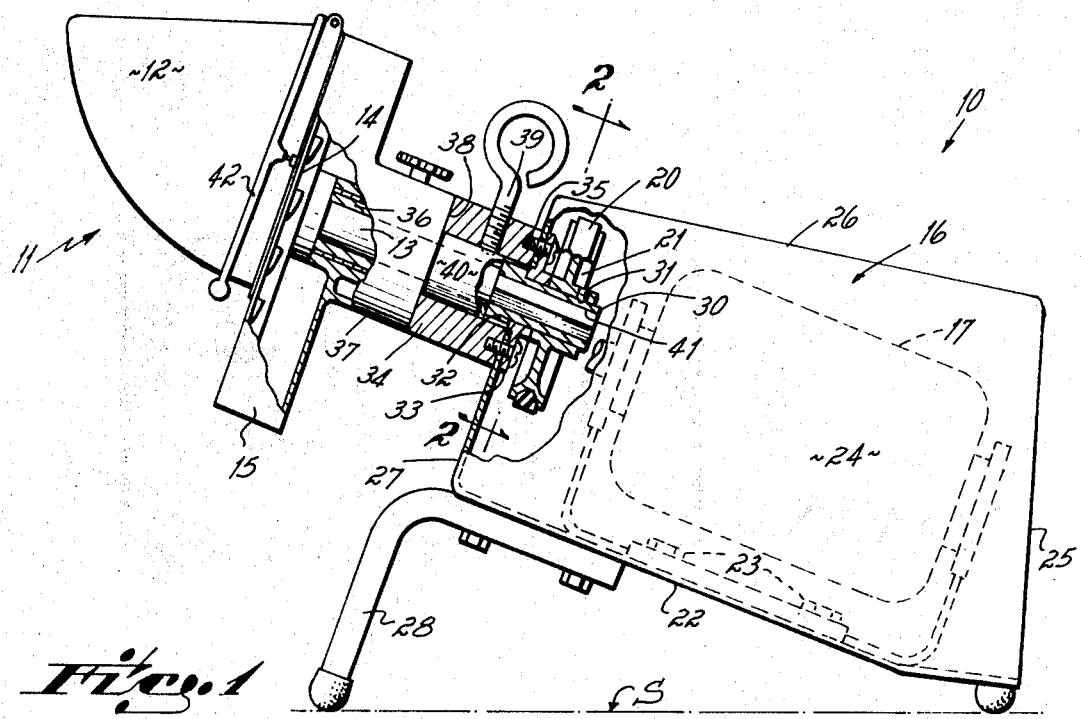
FIG. 1 is a side view of a preferred form of power unit constructed in accordance with the present invention.
Figure 2:
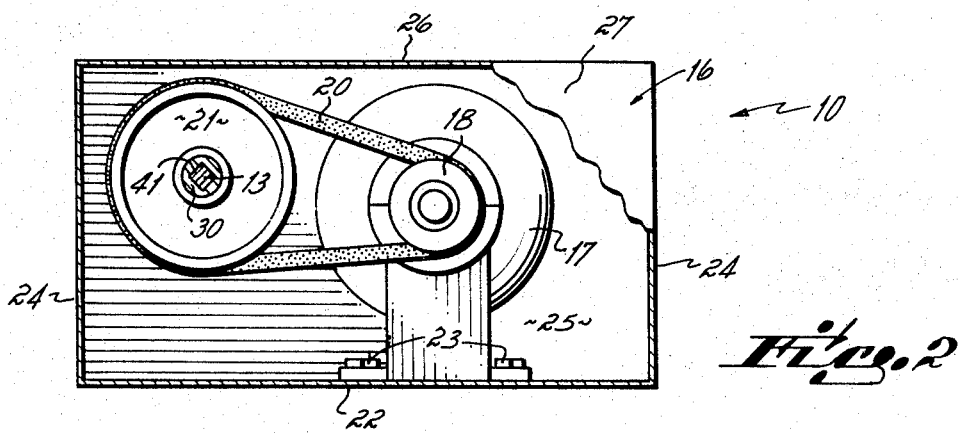
FIG. 2 is a cross-sectional view taken along line 2—2 of FIG. 1.

Referring in detail to the drawings, a power unit constructed in accordance with this invention is shown in FIG. 1 generally as 10. The power unit 10 supports a vegetable cutter attachment 11. The details of construction of the vegetable cutter 11 constitute no part of the present invention. In general, however, the attachment comprises a hopper 12 for receiving vegetables to be comminuted, and a rotatable shaft 13 for supporting a vegetable cutter 14 for engagement with vegetables placed in hopper 12. One typical form of cutter particularly useful for shredding cabbage and the like is shown in my copending application Ser. No. 875,806, filed Nov. 12, 1969, for "Shredder Plate." The comminuted material, for example, shredded cabbage, is discharged from the cutter attachment through a discharge chute 15.

The power unit 10 comprises a housing 16 which encloses a motor 17 and a speed reducer including a drive pulley 18, belt 20 and a driven pulley 21. It is to be understood that other speed reducing means such as a gear drive, friction drive, variable speed drive or other types of belt drive can be utilized. The motor is controlled by switch means (not shown) well known to those in the art. The motor 17 is mounted upon the bottom wall 22 of the housing in any suitable manner, such as by means of bolts 23. The housing further comprises sidewalls 24, a rear wall 25, a top wall 26 and a front wall 27. The forward end of the housing is elevated by means of legs 28 which are mounted on the bottom wall 22 of the housing so they extend downwardly and forwardly of the power unit itself to a counter or other horizontal supporting surface S, tilting the unit up so that its front portion is supported higher than its rear portion with respect to surface S. I have determined that an angle of from 15°—20° with the horizontal is preferable.

Driven pulley 21 is attached to a rotatable sleeve 30 as by means of a setscrew 31 or any key or pin device well known in the art. As pulley 21 turns, sleeve 30 rotates with it. The sleeve includes a shoulder bearing against surface 32 of a thrust plate 33.

A hub 34 is attached to the front wall 27 of housing 16 as by bolts 35 which also hold thrust plate 33 against the front wall of the housing.

As shown in FIG. 1, shredder plate 14 is connected to a drive shaft 13 of the vegetable cutter attachment. Shaft 13 is in turn rotatably mounted in a bearing sleeve 36 carried by hub 37. Hub 37 includes a shoulder 38 and an extension 40 or reduced diameter. Extension 40 is dimensioned so that it fits into a bore of corresponding diameter in hub 34. A bolt 39 threadably engages hub 34 and extends inwardly into contact with extension 40 to rigidly clamp the extension into hub 34. Drive shaft 13 extends past the end of section 40 and includes a portion of rectangular cross section shaped to fit into the bore 41 of sleeve 30. Any shape enabling the bore 41 to drivingly engage shaft 13 will suffice.

Thus, it can be seen that power is transmitted from motor 17 to pulley 18 through belt 20 to pulley 21 to sleeve 30. This sleeve in turn drives shaft 13 which carries plate 14. It is also evident that the sleeve 30 and hub 34 may be replaced with similar parts but of different dimensions to accept a variety of vegetable cutters of different makes and attachments for different functions.

In a preferred type of vegetable cutter an arm 42 attached to a pusher plate (not shown) is pivoted at the top of hopper 12. Downward actuating pressure on arm 42 will cause the plate to press the vegetable into the working area of the cutter, i.e. against cutter disc 14. I have found that where the power unit and hopper are tilted, as contemplated by this invention, gravity tends to urge the food into the working area and considerably less pressure need be applied to handle 42; and in some instances the paddle is not needed at all. Moreover, tilting the power unit raises the rim of the hopper 12 over which food is placed and where the unit is mounted at a sufficient height, it becomes difficult for an operator to reach over the rim and down into the hopper. This measurably increases the safety of the unit.

Also, since the unit is tilted, the discharge chute 15 of the vegetable cutter is disposed at an angle to the horizontal surface and is raised a considerable distance above it. This clearance space provides ample room for a tray or pan to be placed under the chute 15 to receive the comminuted vegetables. It is also important to note that the ends of legs 28 bear against the supporting surface at a point in front of the power unit and not directly under it. The ends of these legs in effect function to stabilize the unit since in order to tip it over it would be necessary to pivot the weight of the entire power unit and part of the vegetable slicer around the leg ends.

From the foregoing disclosure of the general principles of the present invention and the above description of a preferred embodiment, those skilled in the art will readily comprehend the various modifications to which the invention is susceptible.

Accordingly, I desire to be limited only by the scope of the following claims.

I claim:

1. A power unit for driving a high-speed vegetable cutter of the type utilized in a vegetable cutter attachment having a hopper, a drive shaft for supporting and rotating said cutter, said shaft including an extension adapted for connection to the power unit, said power unit comprising:

A housing including a bottom wall and a front wall;

A motor mounted within said housing;

speed-reduction means disposed within said housing and connected to said motor;

a drive sleeve configurated to receive a said shaft extension;

said drive sleeve being interconnected to said speed-reduction means;

a hub mounted on said front wall of the housing and rotatably supporting said drive sleeve; and means supporting said housing at an angle relative to the horizontal with said front wall being elevated.

2. The power unit of claim 1 in which said motor is mounted upon the bottom wall of said housing in a position remote from said front wall and said speed-reduction means is disposed adjacent said front wall.

3. The power unit of claim 1 in which the means for supporting said housing extend forwardly of said front wall.

4. The power unit of claim 1 in which said means for supporting said housing comprise legs depending from said housing and disposed forwardly of the front wall thereof.

5. The power unit of claim 1 in which said hub and sleeve are removably mounted so that the power unit can be utilized with different vegetable cutter attachments.